US012699020B2

(12) United States Patent
Gonzalez et al.

(10) Patent No.: US 12,699,020 B2
(45) Date of Patent: Aug. 4, 2026

(54) SYSTEM AND METHOD FOR DETECTING SEAL LEAKS IN A GAS TURBINE ENGINE

(71) Applicant: Pratt & Whitney Canada Corp., Longueuil (CA)

(72) Inventors: Jeremy Gonzalez, Montreal (CA); Jong Park, North York (CA)

(73) Assignee: Pratt & Whitney Canada Corp., Longueuil (CA)

( * ) Notice: Subject to any disclaimer, the term of this patent is extended or adjusted under 35 U.S.C. 154(b) by 451 days.

(21) Appl. No.: 18/105,649

(22) Filed: Feb. 3, 2023

(65) Prior Publication Data

US 2024/0264029 A1 Aug. 8, 2024

(51) Int. Cl.
G01M 3/24 (2006.01)

(52) U.S. Cl.
CPC ................................. G01M 3/24 (2013.01)

(58) Field of Classification Search
None
See application file for complete search history.

(56) References Cited

U.S. PATENT DOCUMENTS

| | | | |
|---|---|---|---|
| 5,041,989 A | 8/1991 | Kataoka |
| 6,065,345 A | 5/2000 | Holenstein |
| 9,453,784 B2 | 9/2016 | Desilva |
| 11,125,642 B2 | 9/2021 | Huang |
| 2004/0009065 A1 | 1/2004 | Bates |
| 2010/0001851 A1* | 1/2010 | Handa ........................ F17C 1/16 |
| | | | 220/586 |
| 2015/0260611 A1* | 9/2015 | DeSilva .................... F02C 3/04 |
| | | | 73/112.01 |
| 2017/0016779 A1* | 1/2017 | DeSilva ................. G01K 11/24 |
| 2017/0343448 A1* | 11/2017 | Huppe ................ G01M 3/2869 |
| 2020/0408106 A1 | 12/2020 | Karnofski |
| 2022/0034849 A1 | 2/2022 | Nashed |
| 2022/0178731 A1* | 6/2022 | Bivolarsky .......... G01N 29/024 |

OTHER PUBLICATIONS

EP Search Report for EP Patent Application No. 24155740.4 dated Jul. 4, 2024.

* cited by examiner

*Primary Examiner* — Mark A Shabman
(74) *Attorney, Agent, or Firm* — Getz Balich LLC

(57) ABSTRACT

A method of and system for inspecting a sealed compartment within a gas turbine engine is provided. The method includes using at least one acoustic transmitter to produce at least one emitted acoustic signal into a compartment interior cavity. The acoustic transmitter is in communication with the at least one port. The array of acoustic sensors is used to sense acoustic signals. The acoustic sensors are disposed in proximity to the seal outside of the interior cavity of the sealed compartment. Each acoustic sensor is configured to sense emitted acoustic signals produced by the acoustic transmitter and to produce signal data representative of sensed acoustic signals. The presence or absence of a compromised region of the seal is determined using the signal data from at least one of the acoustic sensors of the array of acoustic sensors.

7 Claims, 7 Drawing Sheets

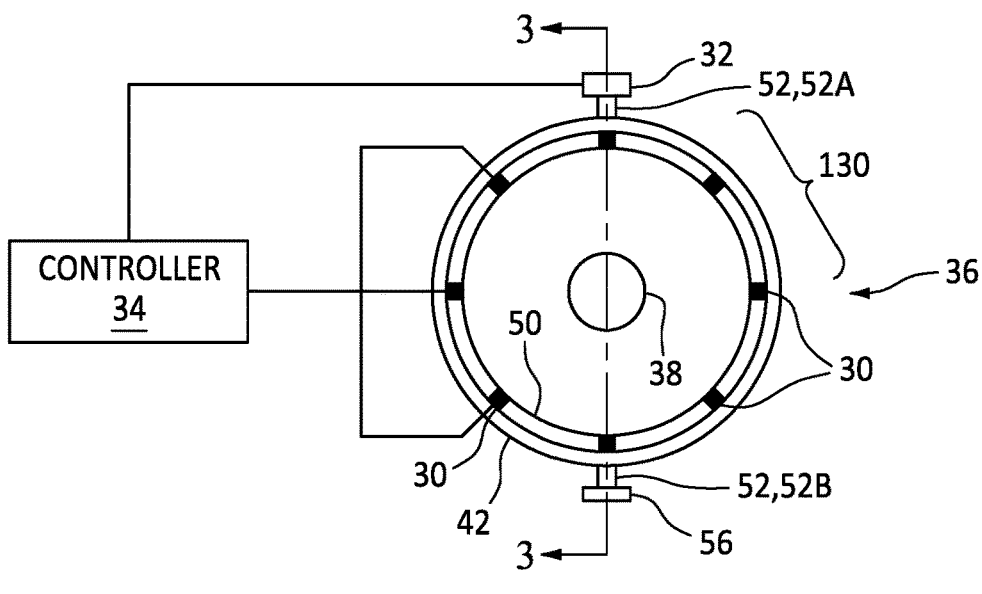
*FIG. 2*
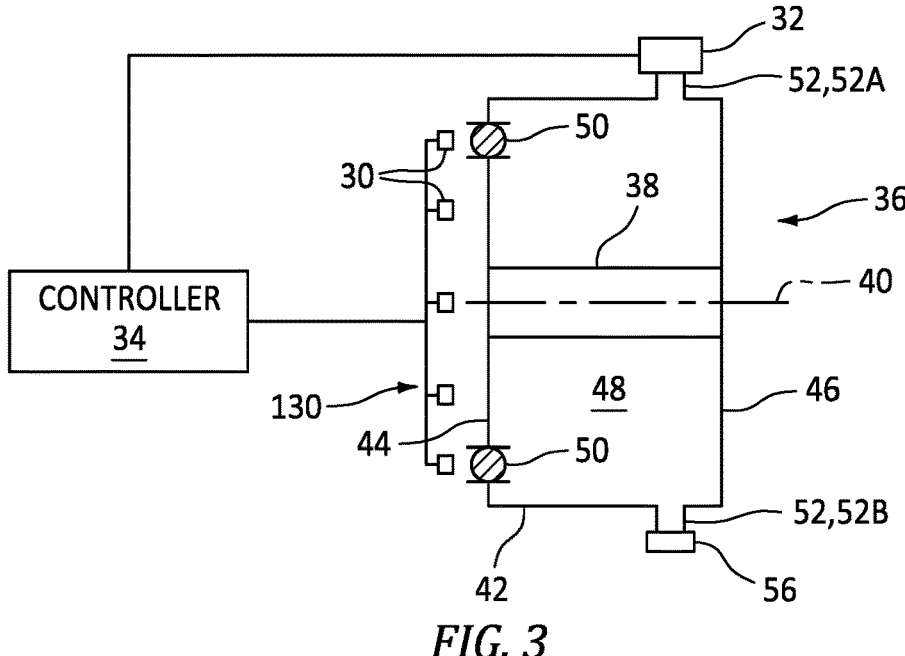
*FIG. 3*
*FIG. 4*

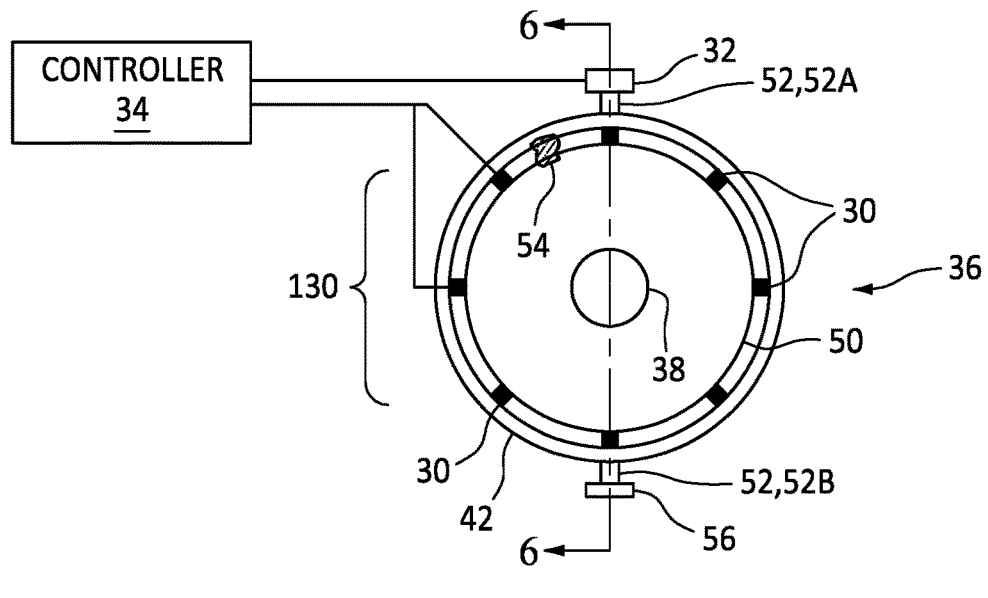
*FIG. 5*
*FIG. 6*
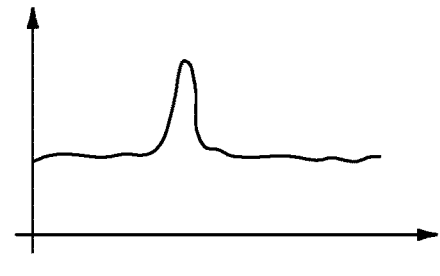
*FIG. 7*

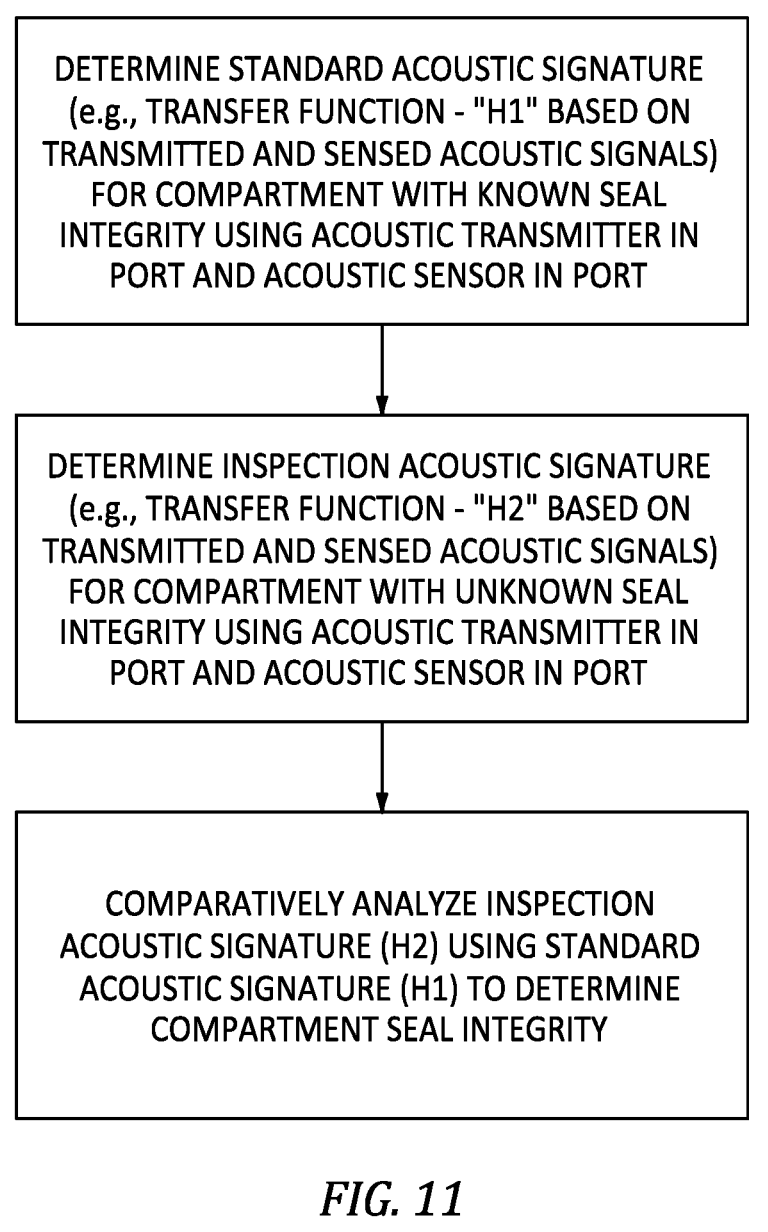

DETERMINE STANDARD ACOUSTIC SIGNATURE (e.g., TRANSFER FUNCTION - "H1" BASED ON TRANSMITTED AND SENSED ACOUSTIC SIGNALS) FOR COMPARTMENT WITH KNOWN SEAL INTEGRITY USING ACOUSTIC TRANSMITTER IN PORT AND ACOUSTIC SENSOR IN PORT

DETERMINE INSPECTION ACOUSTIC SIGNATURE (e.g., TRANSFER FUNCTION - "H2" BASED ON TRANSMITTED AND SENSED ACOUSTIC SIGNALS) FOR COMPARTMENT WITH UNKNOWN SEAL INTEGRITY USING ACOUSTIC TRANSMITTER IN PORT AND ACOUSTIC SENSOR IN PORT

COMPARATIVELY ANALYZE INSPECTION ACOUSTIC SIGNATURE (H2) USING STANDARD ACOUSTIC SIGNATURE (H1) TO DETERMINE COMPARTMENT SEAL INTEGRITY

*FIG. 11*

SYSTEM AND METHOD FOR DETECTING SEAL LEAKS IN A GAS TURBINE ENGINE

BACKGROUND OF THE INVENTION

1. Technical Field

The present disclosure relates to gas turbine engines in general, and to systems and methods for detecting seal leaks between adjacent sealed compartments in particular.

2. Background Information

Seals are used in gas turbine engines to prevent leakage between mating components. Because a deteriorated seal can negatively affect the performance of the gas turbine engine, seals are regularly inspected to ascertain the ability of the seal to function. An in-situ inspection is usually carried out during field maintenance while engines on wing, but not in operation. Conventional seal inspection techniques sometimes include pressurizing a cavity disposed on one side of a seal and thereafter monitoring the static pressure in that cavity for a period of time. A pressure drop below a given threshold may provide an indication that the seal is leaking beyond an acceptable amount. A disadvantage of this method is that it typically requires a large air pressure source to pressurize the cavity. Another disadvantage of this method is that it may identify a potential leak, but may not identify exactly where the leak exists. The complex nature of a gas turbine engine makes it difficult using this method to identify the exact leakage location; e.g., internal cavities are very often not readily accessible in a gas turbine engine and this issue is often exacerbated when the engine is disposed on wing within a nacelle.

What is needed is a system and method that prove an improved method for seal leakage testing, and one that is able to specifically identify where a leak exists.

SUMMARY

According to an aspect of the present disclosure, a method of inspecting a sealed compartment within a gas turbine engine is provided. The sealed compartment has an interior cavity defined by one or more containment walls. The sealed compartment includes a seal and at least one port providing passage into the interior cavity. The method includes: using at least one acoustic transmitter to produce at least one emitted acoustic signal into the interior cavity, the at least one acoustic transmitter in communication with the at least one port; using an array of acoustic sensors to sense acoustic signals, the acoustic sensors disposed in proximity to the seal outside of the interior cavity of the sealed compartment, each acoustic sensor configured to sense emitted acoustic signals produced by the acoustic transmitter and to produce signal data representative of sensed acoustic signals, and determining the presence or absence of a compromised region of the seal using the signal data from at least one of the acoustic sensors of the array of acoustic sensors.

In any of the aspects or embodiments described above and herein, the determining may further include evaluating the signal data from at least one of the acoustic sensors of the array of acoustic sensors relative to the signal data from at least one other acoustic sensor of the array of acoustic sensors.

In any of the aspects or embodiments described above and herein, the determining may further include evaluating the signal data from at least one of the acoustic sensors of the array of acoustic sensors relative to the signal data from each of the other acoustic sensors of the array of acoustic sensors.

In any of the aspects or embodiments described above and herein, the determining may further include evaluating the signal data from at least one of the acoustic sensors of the array of acoustic sensors relative to stored signal data representative of background noise.

In any of the aspects or embodiments described above and herein, the seal may extend circumferentially relative to the compartment, and the sensors of the array of acoustic sensors may be disposed at circumferential positions relative to the seal.

In any of the aspects or embodiments described above and herein, the sensors of the array of acoustic sensors may be uniformly spaced apart from one another.

In any of the aspects or embodiments described above and herein, the sensors of the array of acoustic sensors may be non-uniformly spaced apart from one another.

According to another aspect of the present disclosure, a method of inspecting a sealed compartment within a gas turbine engine is provided. The sealed compartment has an interior cavity defined by one or more containment walls. The sealed compartment includes a seal and at least one port providing passage into the interior cavity. The method includes: using at least one acoustic transmitter to emit at least one acoustic signal into the interior cavity, the acoustic transmitter in communication with the at least one port; using at least one acoustic sensor to sense acoustic signals in the interior cavity, the at least one acoustic sensor in communication with the at least one port, the at least one acoustic sensor configured to sense emitted acoustic signals produced by the at least one acoustic transmitter and to produce signal data representative of sensed acoustic signals; and determining the presence or absence of a compromised region of the seal using the signal data from the at least one acoustic sensor.

In any of the aspects or embodiments described above and herein, the at least one port may include a first port providing passage into the interior cavity and a second port providing passage into the interior cavity, and the at least one acoustic transmitter may be in communication with the first port, and the at least one acoustic sensor may be in communication with the second port.

In any of the aspects or embodiments described above and herein, the determining may include producing an inspection acoustic signature using the signal data from the at least one acoustic sensor, and may include determining the presence or absence of a compromised region of the seal by analyzing the inspection acoustic signature relative to a standard acoustic signature associated with the compartment and an uncompromised seal.

In any of the aspects or embodiments described above and herein, the inspection acoustic signature may include a first transfer function and the standard acoustic signal may include a second transfer function.

In any of the aspects or embodiments described above and herein, the first transfer function may be produced using the emitted acoustic signals and the sensed acoustic signals.

According to another aspect of the present disclosure, a system for inspecting a sealed compartment within a gas turbine engine is provided. The compartment has an interior cavity defined by one or more containment walls. The sealed compartment includes a seal and at least one port providing passage into the interior cavity. The system includes at least one acoustic transmitter, an array of acoustic sensors, and a controller. The acoustic transmitter is configured to selectively produce at least one emitted acoustic signal into the interior cavity. The array of acoustic sensors is configured to sense acoustic signals. The acoustic sensors are configured to be positioned in proximity to the seal outside of the interior cavity of the sealed compartment. Each acoustic sensor is configured to sense emitted acoustic signals produced by the acoustic transmitter and to produce signal data representative of sensed acoustic signals. The controller is in communication with the at least one acoustic transmitter, the array of acoustic sensors, and a non-transitory memory storing instruction. The instructions when executed cause the controller to: control the at least one acoustic transmitter to selectively produce at least one emitted acoustic signal into the interior cavity; receive the signal data produced by the array of acoustic sensors; and determine the presence or absence of a compromised region of the seal using the signal data from at least one of the acoustic sensors of the array of acoustic sensors.

In any of the aspects or embodiments described above and herein, the instructions when executed may cause the controller to evaluate the signal data from at least one of the acoustic sensors relative to the signal data from at least one other acoustic sensor.

In any of the aspects or embodiments described above and herein, the instructions when executed may cause the controller to evaluate the signal data from at least one of the acoustic sensors relative to stored signal data representative of background noise.

According to an aspect of the present disclosure, a system for inspecting a sealed compartment within a gas turbine engine is provided. The sealed compartment has an interior cavity defined by one or more containment walls. The sealed compartment includes a seal and at least one port providing passage into the interior cavity. The system includes at least one acoustic transmitter, at least one acoustic sensor, and a controller. The at least one acoustic transmitter is configured to emit at least one acoustic signal into the interior cavity. The at least one acoustic sensor is configured to sense acoustic signals in the interior cavity, and configured to sense emitted acoustic signals produced by the at least one acoustic transmitter and produce signal data representative of sensed acoustic signals. The controller is in communication with the at least one acoustic transmitter, the at least one acoustic sensor, and a non-transitory memory storing instructions, which instructions when executed cause the controller to: control the at least one acoustic transmitter to selectively produce at least one emitted acoustic signal into the interior cavity; receive the signal data produced by the at least one acoustic sensor; and determine the presence or absence of a compromised region of the seal using the signal data from the at least one of the acoustic sensor.

In any of the aspects or embodiments described above and herein, the at least one port may include a first port providing passage into the interior cavity and a second port providing passage into the interior cavity, and the at least one acoustic transmitter may be configured to be in communication with the first port and the at least one acoustic sensor may be configured to be in communication with the second port.

In any of the aspects or embodiments described above and herein, the instructions when executed may further cause the controller to produce an inspection acoustic signature using the signal data from the at least one acoustic sensor, and determine the presence or absence of a compromised region of the seal by analyzing the inspection acoustic signature relative to a standard acoustic signature associated with the compartment and an uncompromised said seal.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 2 is a diagrammatic end view of a gas turbine engine compartment and an embodiment of the present disclosure system.

FIG. 3 is a diagrammatic sectional view of the gas turbine engine shown in FIG. 2.

FIG. 4 is a graph of signal data from an acoustic sensor.

FIG. 5 is a diagrammatic end view of a gas turbine engine compartment and an embodiment of the present disclosure system.

FIG. 6 is a diagrammatic sectional view of the gas turbine engine shown in FIG. 5.

FIG. 7 is a graph of signal data from an acoustic sensor.

FIG. 11 is a flow chart illustrating an example of a process for evaluating acoustic sensor signals for an embodiment of the present disclosure.

DETAILED DESCRIPTION

Figure 1:
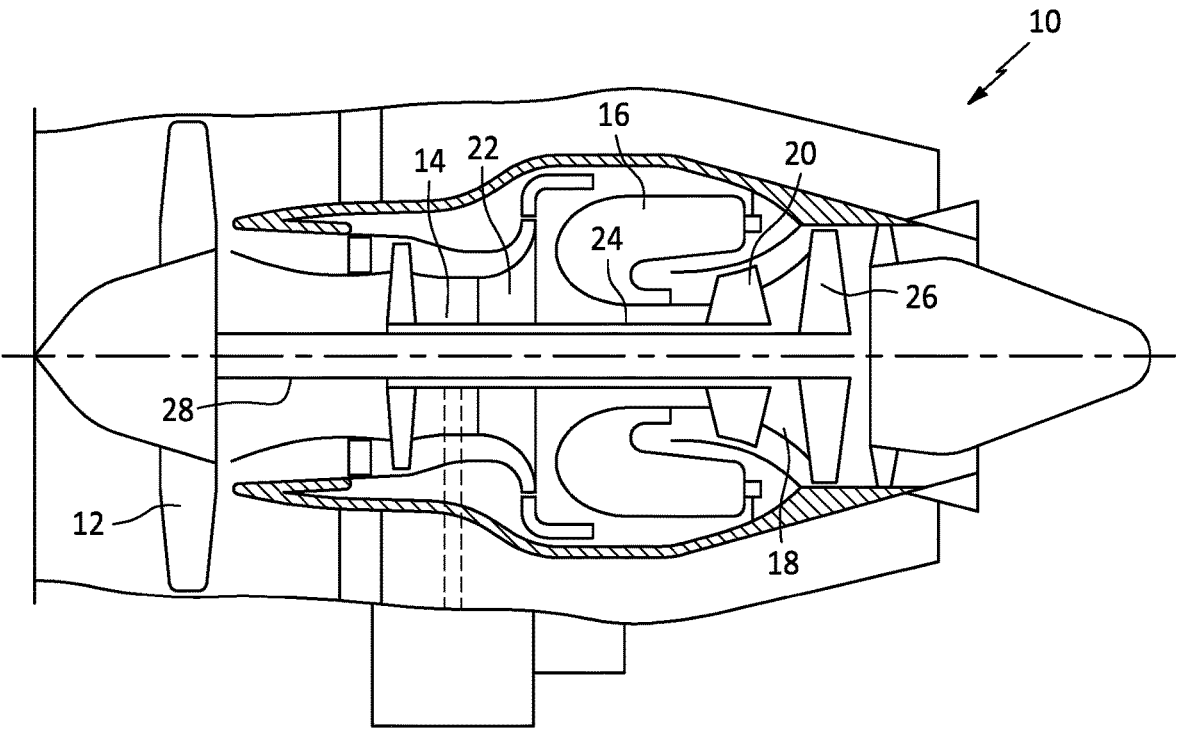
FIG. 1 is a diagrammatic sectional view of a gas turbine engine.

FIG. 1 illustrates an exemplary gas turbine engine 10 that includes a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan 12 rotor and to other low pressure rotor(s) (not shown) of the compressor section 14 via a low pressure shaft 28. The low pressure shaft 28 may extend within the high pressure shaft 24 and rotates independently from the high pressure shaft 24. The present disclosure is directed to a system 28 and methods for maintenance and inspection of gas turbine engines like the turbofan engine shown in FIG. 1 as well as a variety of other types of gas turbine engines, auxiliary power units (APUs), hybrid electric propulsion systems, and the like.

Gas turbine engines include numerous internal compartments that are filled with pressurized air during operation for various purposes; e.g., a first compartment containing air (or other gas) disposed at a first temperature and pressure adjacent a second compartment containing air disposed at a second temperature and pressure. Sealing between the compartments prevents migration of air between the first two compartments; e.g., the seal prevents air in the first compartment migrating into the adjacent second compartment, or leaking to the exterior environment. Air migration from compartment to compartment can negatively affect the performance of the engine and/or negatively affect the effectiveness of cooling in the engine. As stated above, gas turbine engines are subject to routine maintenance and inspection protocols wherein the integrity of a seal between adjacent compartments is evaluated. The present disclosure provides an improved system 28 and methods for evaluating the integrity of a seal between adjacent compartments.

Embodiments of the present disclosure system 28 include at least one acoustic sensor 30, at least one acoustic transmitter 32, and a controller 34. In some embodiments, the at least one acoustic sensor 30 is an array 130 of acoustic sensors 30. Each acoustic sensor 30 is configured to sense an acoustic signal (e.g., an acoustic wave). As will be detailed herein, the acoustic sensors 30 are configured to detect and provide signals representative of acoustic signals emitted by the acoustic transmitter 32. The present disclosure is not limited to any particular type of acoustic sensor other than one that is capable of sensing the acoustic signals emitted by the transmitter 32 in the described application.

The acoustic transmitter 32 is configured to selectively produce an acoustic signal in a form that can be readily sensed by the acoustic sensors 30. The acoustic signal may be in the range of about 20 Hz to about 20 kHz. In preferred embodiments, the acoustic signals produced by the acoustic transmitter 32 are in a form that is repeatable and easily distinguishable in gas turbine engine inspection environment; e.g., distinguishable from any background environmental acoustic signals that may be present during the inspection process. In some embodiments, the acoustic transmitter 32 may be configured to selectively produce a plurality of different signals; e.g., a first signal at a first frequency, a second signal at a second frequency, and the like. In some embodiments, the "transmitter" may in fact include a plurality of independent transmitters, each configured to produce different acoustic signals; e.g., at a different frequencies. In preferred embodiments, the acoustic transmitter 32 produces acoustic signals that are characterized by a strong signal to noise ratio (SNR). The acoustic transmitter 32 may be controlled to produce an acoustic signal on demand, or periodically, or in a frequency sweeping mode, or the like. The present disclosure is not limited to any particular transmitter 32 control methodology.

In some embodiments, the present disclosure may include components configured to facilitate the sensing and processing of the selectively produced acoustics signals. Examples of such components include signal filtering components, signal amplifiers, and the like.

The controller 34 is in communication with the array 130 of acoustic sensors 30, the at least one acoustic transmitter 32, and other system components as described herein. The controller 34 may be in communication with these components to control and/or receive signals therefrom to perform the functions described herein. The controller 34 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system 28 to accomplish the same algorithmically and/or coordination of system components. The controller 34 includes or is in communication with one or more memory devices. The present disclosure is not limited to any particular type of memory device, and the memory device may store instructions and/or data in a non-transitory manner. Examples of memory devices that may be used include a computer readable storage medium, a read-only memory, random access memory, volatile memory, non-volatile memory, static memory, dynamic memory, flash memory, cache memory, and/or any device that stores digital information. The controller 34 may include, or may be in communication with, an input device that enables a user to enter data and/or instructions, and may include, or be in communication with, an output device configured, for example to display information (e.g., a visual display or a printer), or to transfer data, etc. Communications between the controller 34 and other system components may be via a hardwire connection or via a wireless connection.

FIG. 2 diagrammatically illustrates a compartment 36 disposed around a shaft 38 extending along a central axis 40 of an engine. Pressurized compartments 36 disposed within a gas turbine engine may assume a variety of configurations, which configurations are often annular. The compartments 36 shown in FIGS. 2, 3, 5, 6, 8, and 9 are intended to diagrammatically represent an annular compartment 36 within a gas turbine engine that is pressurized during operation of the engine. The present disclosure is not, however, limited to use with any particular compartment 36 configuration. FIG. 3 is a sectional side view of the compartment 36 shown in FIG. 2 from the viewpoint of sectional cut line 3-3. The compartment 36 has an outer radial wall 42, a first end wall 44, and a second end wall 46 that is opposite the first end wall 44. The outer radial wall 42 and first and second end walls 44, 46 define an interior cavity 48 of the compartment 36. A circumferentially extending seal 50 is diagrammatically shown engaged with the first end wall 44 of the compartment 36. The seal 50 is configured to seal (e.g., to prevent airflow) between this compartment 36 and an adjacent compartment (not shown) or other region outside of the compartment 36 disposed on the opposite side of the first end wall 44. A carbon seal is an example of a seal 50 that may be used in a gas turbine engine to seal between compartments. In the FIGURES, the seal 50 is shown diagrammatically to facilitate an understanding of the present disclosure. The present disclosure is applicable to any seal configured to seal between adjacent compartments and therefore is not limited to any particular type of seal 50. The compartment 36 is shown diagrammatically as having a cylindrical configuration but is not limited thereto.

The compartment 36 includes at least one port 52 disposed in the outer radial wall 42. The port 52 provides an access passage into the interior cavity 48 of the compartment 36. An example of a structure that may be used as a compartment port 52 in a gas turbine engine is an opening configured for receiving a borescope. The compartment 36 diagrammatically shown in FIGS. 3, 5, 6, 8, and 9 includes a first port 52A and a second port 52B, disposed opposite one another (e.g., 180 degrees around the circumference). The present disclosure may have more than two ports 52 (or three ports 52, or four ports 52, or more), and the ports 52 are not limited to any particular offset from one another; e.g., two ports 52 at 180 degrees offset, three ports 52 at one hundred and twenty degrees from one another, and the like.

FIGS. 2 and 3 illustrate an embodiment of the present disclosure having an array 130 of acoustic sensors 30 disposed circumferentially in proximity to the circumference of the seal 50 outside of the compartment 36. The sensors 30 in the array 130 are shown uniformly spaced apart from one another around the circumference. The present disclosure is not limited to any particular sensor 30 spacing arrangement relative to the seal 50. In some embodiments, sensors 30 within the array 130 may be located at predetermined positions relative to the seal 50. If, for example, certain seal 50 regions are more prone to leakage and other seal 50 regions have a very low probability of leakage, the sensors 30 may be non-uniformly distributed emphasizing the potential issue regions over the regions with low probability of leakage. The array 130 of sensors 30 may be mounted so that the sensors 30 are mounted before, during, and after inspection, and are intended to be present during operation of the gas turbine engine. Hence, when the sensor array 130 is available for use at any time. Alternatively, the sensor array 130 may be configured so that it can be deployed prior to an inspection and subsequently removed after the inspection.

During an inspection, the acoustic transmitter 32 is operated to produce acoustic signals. The acoustic transmitter 32 may be operated to selectively produce acoustic signals on demand, or it can be controlled to produce acoustic signals periodically, or in any other manner as described above. The acoustic transmitter 32 may be disposed in the port 52 disposed in the compartment wall, or it may extend through the port 52 and be disposed within the interior cavity 48. In some embodiments, the port 52 may be hermetically sealed to mitigate the potential for environmental acoustic signals traversing the port and creating noise. The acoustic sensors 30 in the sensor array 130 disposed circumferentially around the seal 50 are in communication with the controller 34, sending signals representative of sensed acoustic signals ("inspection acoustic signals"). The controller 34 in turn may process the sensor signals into a form discernible by the user. For example, FIGS. 2 and 3 diagrammatically illustrate a compartment 36 having a seal 50 properly functioning. FIG. 4 is a diagrammatic graph of amplitude versus frequency based on the sensor signals provided to the controller 34 for a single sensor 30. FIG. 4 illustrates a relatively flat amplitude signal representing background noise and the absence of a distinguished signal (e.g., an amplitude peak) associated with an acoustic signal emitted from the acoustic transmitter 32. If all of the acoustic sensors 30 in the array 130 produce similar signal patterns, then there is no indication of a compromised seal region. In some embodiments, the process of determining the absence or presence of a compromised seal 50 region may involve comparing the signal data (i.e., the "inspection acoustic signals") of one acoustic sensor 30 relative to the signal data produced by other acoustic sensors 30 within the array 130. In alternative embodiments, the process of determining the absence or presence of a compromised seal region may involve comparing the signal data of each acoustic sensor 30 ("inspection signal data") relative to a standard set of signal data (e.g., based on empirical data) that may be representative of background acoustic signals in the absence of a leak across the seal 50.

FIGS. 5-7, in contrast, diagrammatically illustrate a compartment 36 having a compromised region 54 adjacent the top of the seal 50. The graph for each sensor 30 in uncompromised seal regions may appear as shown in FIG. 4; i.e., indicating only background noise. The graph for the sensor 30 in closest proximity to the compromised seal region 54 (e.g., see FIG. 7), in contrast, illustrates a relatively sharp peak deviating from the signals representing background noise. The sharp peak is indicative of an acoustic signal differing from the background noise and consequently indicative of a compromised seal region 54. The ability of air to leak through the compromised seal region 54 relates to the ability of the acoustic signal (i.e., acoustic waves) to also traverse the compromised seal region 54. The exact form of the acoustic signal deviating from the acoustic signal representative of background noise will likely vary depending on the nature of the compromised seal region 54.

Of course, it is possible that a compromised seal region 54 may extend a distance proximate more than one sensor 30, or a seal 50 may have more than one compromised region, which regions may be sensed by independent sensors 30. In these instances, more than one sensor 30 within the array 130 may produce signal data indicative of the compromised region(s). Still further, acoustic signals associated with a compromised seal region 54 may be sensed by both "near" and "far" sensors 30 relative to the compromised seal region 54. In these instances, the characteristics (e.g., amplitude) of the sensed acoustic signals produced by the near and far sensors 30 may provide information regarding the location of the compromised seal region 54; e.g., the signal amplitude (greater vs. lesser) sensed by the respective acoustic sensors 30 may be indicative of proximity to the compromised seal region 54.

FIGS. 4 and 7 illustrate a graphical representation of the sensed acoustic signals. The present disclosure system 28 may be configured to produce a visual representation like that shown in FIGS. 4 and 7, but a visual representation is not required. In some embodiments, the controller 34 may be configured (e.g., via stored instructions) to process the acoustic signals produced by the acoustic sensors 30 in the array 130 and provide information (e.g., in numerical form) relating to those acoustic sensors 30. The aforesaid processing may include threshold filtering configured to evaluate signal variance and the significance thereof, if any; e.g., signal variance below a predetermined threshold may be considered to be inconsequential (no flag raised), and signal variance above a predetermined threshold may be considered to be consequential (flag raised). An analysis of this type may produce information (e.g., data values) useful to an inspector to determine the presence or absence of a compromised seal region.

Embodiments of the present disclosure system 28 may be configured to facilitate identifying a compromised seal region. For example, the signals produced by a respective acoustic sensor 30 may be identifiable by the controller 34 from the signals produced by other acoustic sensors 30; i.e., the controller 34 may be able to distinguish signals from sensor A from those produced by sensor B and the like. The present disclosure is not limited to any particular manner for distinguishing signals from a sensor A from those produced by sensor B. Using an acoustic transmitter 32 that transmits a plurality of different frequencies and a plurality of sensors, each configured to detect a specific frequencies is an example of how sensors 30 may be distinguished from one another.

In the embodiment shown in FIGS. 2, 3, 5, and 6, the compartment 36 includes a first port 52A and a second port 52B. The acoustic transmitter 32 is in communication with the first port 52A in a manner that permits acoustic signals emitted by the acoustic transmitter 32 to enter the interior cavity 48 of the compartment 36. In this embodiment, the second port 52B is closed with a cap 56 to closed the passage into the compartment 36. As stated above, the acoustic transmitter 32 may be disposed in the first port 52A, or it may extend through the first port 52A and be disposed within the interior cavity 48, and the first port 52A may be hermetically sealed.

Figures 8, 9:
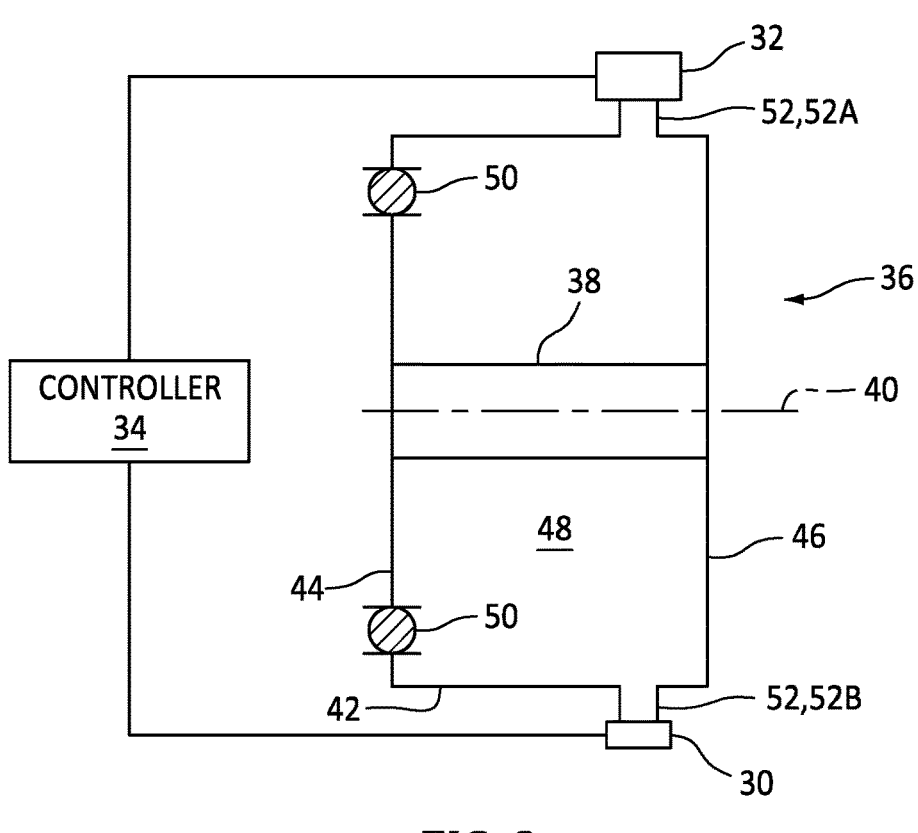
FIG. 8 is a diagrammatic sectional view of the gas turbine engine compartment and an embodiment of the present disclosure system.
FIG. 9 is a diagrammatic sectional view of the gas turbine engine compartment and the present disclosure system shown in FIG. 8.

In the embodiment shown in FIGS. 8 and 9, the compartment 36 includes a first port 52A and a second port 52B. The acoustic transmitter 32 is in communication with the first port 52A in a manner that permits acoustic signals emitted by the acoustic transmitter 32 to enter the interior cavity 48 of the compartment 36. Here again, as stated above the acoustic transmitter 32 may be disposed in the first port 52A, or it may extend through the first port 52A and be disposed within the interior cavity 48, and the first port 52A may be hermetically sealed. In this embodiment, an acoustic sensor 30 is disposed in communication with the second port 52B. The acoustic transmitter 32 may be disposed in the second port 52B, or it may extend through the second port 52B and be disposed within the interior cavity 48, and the second port 52B may be hermetically sealed. This embodiment provides a means for acoustically testing the integrity of the seal 50 without the need to dispose acoustic sensors 30 around the circumference of the seal 50. FIG. 8 diagrammatically shows a seal 50 that is functioning. FIG. 9 diagrammatically shows a seal 50 that has a compromised region 54.

Figure 10A:
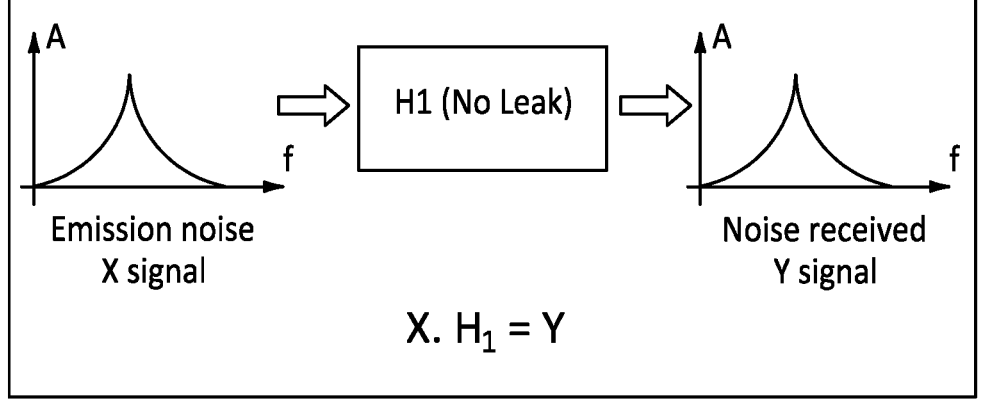
FIG. 10A is a diagrammatic representation of a process example for evaluating acoustic sensor signals for an embodiment of the present disclosure, showing no seal leak.
Figure 10B:
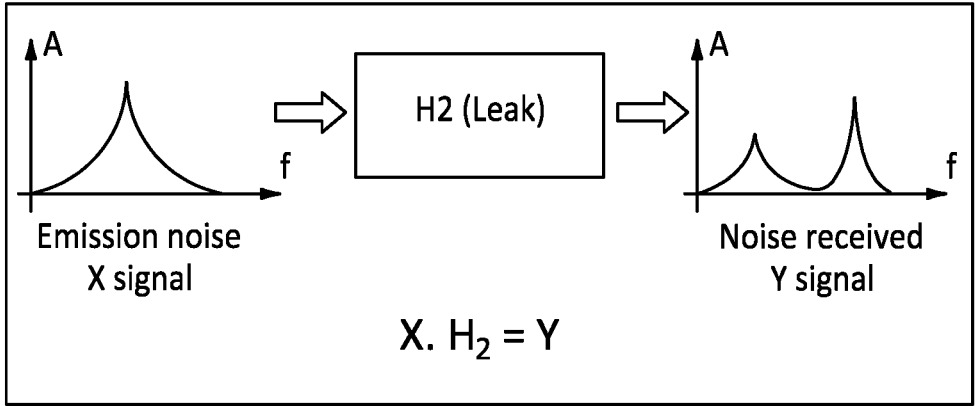
FIG. 10B is a diagrammatic representation of a process example for evaluating acoustic sensor signals for an embodiment of the present disclosure, showing a seal leak.

Referring to FIGS. 10A, 10B, and 11, the above-described configuration (acoustic transmitter 32 in the first port 52A, acoustic sensor 30 in the second port 52B) may be used to initially sense a compartment 36 known to have appropriate seal 50 integrity. The collected signal data may be processed to produce an acoustic signature (a "standard acoustic signature" that may be in the form of a transfer function "H1") associated with a compartment 36 known to have appropriate seal 50 integrity. During an inspection, the signals produced by the acoustic sensor 30 in communication with the second port 52B may be processed in the same manner to produce an acoustic signature (an "inspection acoustic signature" in the form of a transfer function "H2") for the specific compartment 36 under inspection. The inspection acoustic signature can then be analyzed relative to the standard acoustic signature; e.g., a comparative analysis of the standard transfer function versus the inspection transfer function (H1 vs H2). Discrepancies between the inspection acoustic signature and the standard acoustic signature may provide information regarding the integrity of the compartment seal 50.

In many instances, a seal 50 may wear over time as a result of engine operation or for other reason. A seal 50 with some degree of wear may function within acceptable parameters, but may result in a different acoustic signature that the same seal 50/compartment 36 arrangement with no wear. In view thereof, some embodiments of the present disclosure may include stored information (e.g., stored instructions, or a stored database) relating to acoustic signatures ("milestone acoustic signatures") associated with a compartment 36 known to have appropriate seal 50 integrity at a plurality of operating milestones; e.g., an acoustic signature associated with intervals of flight hours (e.g., intervals of "X" number of flight hours—X, 2X, 3X and the like), or an acoustic signature associated with numbers of flight cycles (where each flight cycle includes a take-off and a landing—"Y" number of flight cycles, 2Y flight cycles, etc.), or the like. As described above, the signals produced by the acoustic sensor 30 in communication with the second port 52B may be processed to produce an inspection acoustic signature and that inspection acoustic signature may be analyzed relative to the appropriate milestone acoustic signature.

In some embodiments the stored information may be configured (e.g., by mathematical equation, or predictive analysis, or the like) to produce a determined standard acoustic signature for the compartment 36 based on engine operational history. This may be accomplished, for example, by using an algorithmic equation fit to collected data, or the like. An inspection acoustic signature and the determined acoustic signature can then be used to evaluate the integrity of the compartment seal 50.

Figure 12:
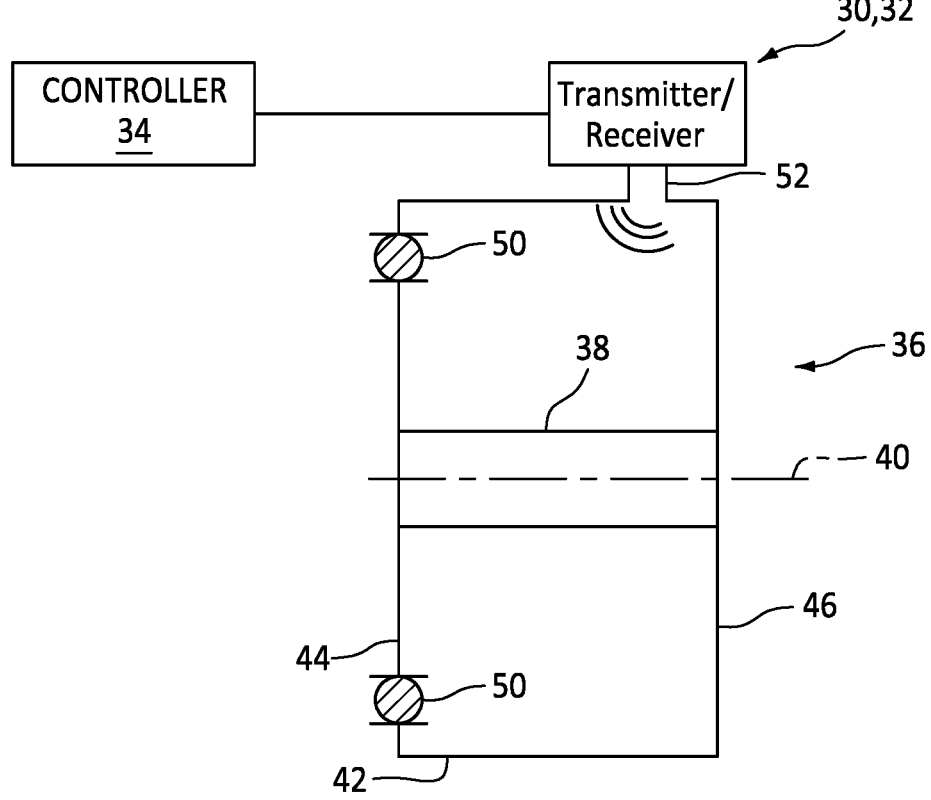
FIG. 12 is a diagrammatic sectional view of the gas turbine engine compartment and an embodiment of the present disclosure system.

As stated above, the present disclosure may be utilized in an embodiment wherein the compartment 36 has only a single port 52. FIG. 12 diagrammatically illustrates an embodiment wherein an acoustic sensor 30 and an acoustic transmitter 32 utilize the same port 52. A benefit of this embodiment is that it may be used when there is only a single port 52 available. As an alternative embodiment, transmitting and receiving transducers (described above as acoustic sensor 30 and acoustic transmitter 32) may take the form of an ultrasonic transmitter and an ultrasonic receiver, or a single transducer configured to act as both an ultrasonic transmitter and receiver. The ultrasonic transmitter and receiver, or singular ultrasonic transducer, may be controlled to selectively transmit ultrasonic signals into the interior cavity 48 of the compartment 36 and to receive reflected ultrasonic signals. The reflected ultrasonic signals generated in a compartment 36 that does not include a compromised seal 50 will be distinct from the reflected ultrasonic signals generated in a compartment 36 that does include a compromised seal 50. In this alternative embodiment, the transmitted ultrasonic signals are typically above 20 kHz.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of inspecting a sealed compartment within a gas turbine engine, the sealed compartment having an interior cavity defined by one or more containment walls, the sealed compartment including a seal and at least one port providing passage into the interior cavity, the method comprising:

using at least one acoustic transmitter to produce at least one emitted acoustic signal into the interior cavity, the at least one acoustic transmitter in communication with the at least one port;

using an array of acoustic sensors to sense at least one acoustic signal, the array of acoustic sensors disposed in proximity to the seal outside of the interior cavity of the sealed compartment, each of the array of acoustic sensors is configured to sense the at least one acoustic signal emitted and produced by the at least one acoustic transmitter and to produce signal data representative of the at least one acoustic signal sensed; and determining the presence or absence of a compromised region of the seal using the signal data from at least one of the acoustic sensors of the array of acoustic sensors;

wherein each of the acoustic sensors of the array of acoustic sensors are non-uniformly spaced apart from one another.

2. The method of claim 1, wherein the determining further includes evaluating the signal data from the at least one of the acoustic sensors of the array of acoustic sensors relative to the signal data from at least one other acoustic sensor of the array of acoustic sensors.

3. The method of claim 2, further comprising, in a state in which the compromised region of the seal is determined, determining a location of the compromised region based on the signal data from the at least one of the acoustic sensors of the array of acoustic sensors relative to the signal data from the at least one other acoustic sensor of the array of acoustic sensors.

4. The method of claim 1, wherein the determining further includes evaluating the signal data from the at least one of the acoustic sensors of the array of acoustic sensors relative to the signal data from each of the other of the acoustic sensors of the array of acoustic sensors.

5. The method of claim 1, wherein the determining further includes evaluating the signal data from the at least one of the acoustic sensors of the array of acoustic sensors relative to stored signal data representative of a background noise.

6. The method of claim 1, wherein the seal has an annular shape; and wherein the seal extends circumferentially relative to the compartment, and each of the acoustic sensors of the array of acoustic sensors are disposed at circumferential positions relative to the seal.

7. The method of claim 1, wherein the acoustic sensors of the array of acoustic sensors are disposed at regions of the seal that are more prone to be compromised.

* * * * *